HENRY PEMBERTON, OF ALLEGHENY CITY, PENNSYLVANIA.

Letters Patent No. 78,005, dated May 19, 1868.

IMPROVEMENT IN THE MANUFACTURE OF SULPHATE OF ALUMINA.

The Schedule referred to in these Letters Patent and making part of the same.

*To all whom it may concern:*

Be it known that I, HENRY PEMBERTON, of Allegheny City, in the county of Allegheny, and State of Pennsylvania, have invented a new and useful Improvement in Manufacture of Alum and Aluminous Compounds; and I do hereby declare the following to be a full, clear, and exact description thereof.

My invention consists in an improved mode of making the salts of alumina from precipitated hydrate of alumina.

Hydrate of alumina is readily obtained from kryolite and other minerals, by the decomposition of the aluminate of soda or other alkali, (as the case may be.) This process, however, does not constitute part of my invention, which I am about to describe.

The ordinary method of making sulphate of alumina and other salts of alumina, as heretofore practised, has been to dissolve the hydrate of alumina in a boiling dilute solution of the acid until sufficient alumina has been dissolved to form, with the dilute acid, a neutral or slightly basic salt of alumina, the excess of the base being necessary to insure a perfect neutralization of the acid. To effect this result, it is necessary to keep the mixture constantly boiling for many consecutive hours or days.

In making sulphate of alumina by the old process, the alumina, being mixed with the dilute sulphuric acid, as above described, contains from twenty to thirty per cent. of sulphate of alumina. It is then allowed to settle, after which the clear liquor is decanted from the sediment, and then evaporated, in copper or leaden vessels, to the proper consistency. It is then ladled out into leaden moulds, in which it cools and dries.

The sulphate of alumina thus obtained is very dense and hard, so much so as to be with difficulty attacked and dissolved by water when it is subsequently required for use.

Besides the hardness of the product, another and more serious objection to the ordinary mode of manufacture is the danger which exists of the formation of the basic sulphate of alumina, $Al_2O_3 + SO_3$, instead of the neutral sulphate, $Al_2O_3 + 3SO_3$, the former being an insoluble compound, which is always formed, in greater or less proportions, when dilute solutions of the neutral sulphate are boiled with an excess of hydrate of alumina.

This basic sulphate, once formed, is not dissolved again by the dilute acid, but can only be by a very concentrated acid; and the liability to its formation by the process ordinarily employed in the manufacture of sulphate of alumina is a great difficulty, and is, at times, attended with serious loss, both of alumina and of sulphuric acid. The ordinary process is also both tedious and expensive, involving a great expenditure of time, fuel, and labor.

I have thus referred to the ordinary mode of making salts of alumina, in order that that which is new in my method may be distinctly ascertained, and its simplicity and economy of operation be pointed out.

I have discovered that, when hydrate of alumina is mixed with sulphuric acid and water in the proper atomic proportions to form the neutral or slightly basic sulphate of alumina, a strong chemical reaction takes place, which results speedily in the production of the desired salt of alumina, without the necessity of boiling or evaporation, and that the article thus produced is less dense, and better fitted for use, than the same article manufactured by the old process.

To enable others skilled in the art or science to make use of my improved process in the manufacture of the salts of alumina, I will proceed to describe it more fully.

The hydrate of alumina, procured in any convenient manner, but preferably from the decomposition of the mineral known as kryolite, is mixed in a convenient leaden vessel, with sulphuric acid and water. The quantity of water should be only sufficient, or very little more than sufficient, to afford the water of crystallization required in the formation of the salt, and the quantity of sulphuric acid should be such as is necessary to form, with the alumina and water, the neutral (or slightly basic) sulphate of alumina, these several ingredients being mixed in the atomic proportions indicated by the symbol of neutral sulphate of alumina, $Al_2O_3 + 3SO_3 + 18HO$. These ingredients being mixed together, a powerful chemical reaction ensues, attended with great evolution of heat, and the escape of carbonic-acid gas, resulting from the decomposition of the traces of carbonate of soda retained in chemical combination by the alumina, as procured from kryolite.

As soon as this chemical action is over, the mass, which, when first mixed, was perfectly fluid, and in a state of froth and foam, begins rapidly to harden, and, in a few minutes, is converted into a white porous mass, solid and firm, without being too dense and hard, and (if the proper amount of water were present in the hydrate of alumina and sulphuric acid) sufficiently dry to be packed as soon as cold, or, if preferred, ground to a fine powder, and then packed for sale.

If, however, the amount of water present in the operation was in excess of that required for crystallization, the mass, when cold, will be found to be slightly damp. The excess of water may be readily removed, in such a case, by placing the fresh-made sulphate of alumina in a warm room, when the excess of moisture will dry out.

The sulphate of alumina, thus manufactured, contains from fifteen to sixteen per cent. of alumina, in a soluble state, it being almost instantly and entirely soluble in water, with the exception of inconsiderable traces of alumina, in combination with silica, phosphoric acid, &c., which will amount, in all, to much less than one per cent.

It is applicable to all the purposes to which either ordinary alum or the sulphate of alumina, as commonly prepared, are applied, and is much more readily soluble in water.

In the manufacture of the ordinary alums, (the double sulphate of alumina and potash, or of alumina and ammonia,) the sulphate of alumina may be first prepared in the way I have just described, and then dissolved in water, and this solution, mixed with the solution of sulphate of potash or sulphate of ammonia, as the case may be, from which alum is procured in the ordinary way by crystallization.

The chief advantages of my improved process over those heretofore known and practised in the manufacture of sulphate of alumina are—

First, in the manufacture, the saving of time and cost of labor, fuel, and apparatus, attained by dispensing entirely with the operation of boiling and evaporating the solutions, and the avoidance of the danger of producing the almost insoluble basic sulphate of alumina, instead of the readily soluble neutral sulphate; and Second, in the result, that the article produced by my improved process is in a form capable of dissolving rapidly and easily in water, while the sulphate alumina manufactured by the ordinary processes, owing to its great solidity and impermeability to water, is very slowly soluble.

Having thus described my improvement,

What I claim as my invention, and desire to secure by Letters Patent, is—

The employment, in the manufacture of the sulphate and other salts of alumina, of the improved process hereinbefore described.

In testimony whereof, I, the said HENRY PEMBERTON, have hereunto set my hand.

H. PEMBERTON.

Witnesses:
    ELL TORRANCE,
    G. H. CHRISTY.